(12) United States Patent
Tella et al.

(10) Patent No.: US 7,670,072 B2
(45) Date of Patent: Mar. 2, 2010

(54) CAM-LOCKING POSITIONING MECHANISM

(75) Inventors: Richard P. Tella, Sunnyvale, CA (US); Robert G. Ritter, Los Altos, CA (US)

(73) Assignee: Aptina Imaging Corporation, Grand Cayman (KY)

( * ) Notice: Subject to any disclaimer, the term of this patent is extended or adjusted under 35 U.S.C. 154(b) by 0 days.

(21) Appl. No.: 12/185,395

(22) Filed: Aug. 4, 2008

(65) Prior Publication Data

US 2008/0292307 A1 Nov. 27, 2008

Related U.S. Application Data

(63) Continuation of application No. 10/870,215, filed on Jun. 17, 2004, now Pat. No. 7,407,337.

(51) Int. Cl.
*G03B 17/00* (2006.01)
*B25G 3/00* (2006.01)
*G02B 15/14* (2006.01)

(52) U.S. Cl. .................. 396/529; 403/350; 359/702

(58) Field of Classification Search ............... 279/43.4, 279/51, 96; 359/702, 825–826; 396/529; 411/103, 114, 195, 316; 403/102, 350
See application file for complete search history.

(56) References Cited

U.S. PATENT DOCUMENTS

| | | | |
|---|---|---|---|
| 611,556 A | 9/1898 | Blanton | |
| 661,558 A * | 11/1900 | Shuff | 411/318 |
| 2,284,847 A * | 6/1942 | Raymond | 403/350 |
| 2,949,692 A | 8/1960 | Kuhn | |
| 3,319,510 A | 5/1967 | Rapata | |
| 3,515,418 A | 6/1970 | Nielsen, Jr. | |
| 3,924,775 A | 12/1975 | Andreaggi | |
| 4,006,787 A | 2/1977 | Rumpp et al. | |
| 4,076,437 A | 2/1978 | Mazzolla | |
| 4,238,164 A | 12/1980 | Mazzolla | |
| 4,653,142 A * | 3/1987 | Upton | 16/429 |
| 4,785,190 A | 11/1988 | Frankena | |
| 5,109,572 A | 5/1992 | Park | |
| 5,267,474 A | 12/1993 | Ten Hoven | |
| 5,424,873 A | 6/1995 | Uziie et al. | |
| 5,589,671 A | 12/1996 | Hackbarth et al. | |
| 5,717,528 A | 2/1998 | Ihara et al. | |
| 5,719,712 A | 2/1998 | Ishikawa | |
| 5,851,006 A | 12/1998 | Spillner et al. | |

(Continued)

FOREIGN PATENT DOCUMENTS

GB 1009354 A 11/1965

(Continued)

*Primary Examiner*—W.B. Perkey
*Assistant Examiner*—Leon W Rhodes
(74) *Attorney, Agent, or Firm*—RatnerPrestia

(57) ABSTRACT

A locking positioning mechanism includes a first element and a second element, the first element and second element rotatable relative to one another about a common rotational axis between a locked orientation and an unlocked orientation and axially translatable relative to one another. The mechanism further includes one or more first locking surfaces of the first element and one or more second locking surfaces of the second element. The second locking surfaces are configured to clear the first locking surfaces in the unlocked orientation. The second locking surface is configured for an interference fit with a first locking surface in the locked orientation.

8 Claims, 4 Drawing Sheets

U.S. PATENT DOCUMENTS

| | | |
|---|---|---|
| 6,227,782 B1 * | 5/2001 | Bowling et al. ............. 411/114 |
| 6,761,501 B1 * | 7/2004 | Nakatani ................. 403/109.5 |
| 6,802,328 B2 | 10/2004 | Lin |
| 6,979,144 B2 | 12/2005 | Iwasaki |
| 2002/0089176 A1 | 7/2002 | Iwasaki |
| 2002/0167605 A1 * | 11/2002 | Akimoto et al. ............. 348/374 |

FOREIGN PATENT DOCUMENTS

| | | |
|---|---|---|
| JP | 54-103021 A | 8/1979 |
| JP | 57200005 A * | 12/1982 |
| JP | 52-62021 | 5/1997 |

* cited by examiner

CAM-LOCKING POSITIONING MECHANISM

BACKGROUND OF THE INVENTION

Many products contain components that are positioned relative to one another during a manufacturing assembly process. However, after initial positioning, it may be desired that these components be held in a fixed relative position. For example, many mobile cameras (those embedded in wireless telephones for instance) have a fixed focal length. Accordingly, the camera modules, e.g., lens assembly components, may be adjustably focused during manufacturing and then are locked for the life of the product.

Current approaches for facilitating adjustment during manufacturing and locking of camera components thereafter include threading a plastic part that holds the lenses into another plastic housing that holds the imaging sensor. The spacing between the lens assembly and the sensor is adjusted by turning the threaded engagement. When correctly positioned, UV cure epoxy is typically used to lock the two plastic parts together. This approach has a number of undesirable attributes, for example: 1) the threaded engagement can generate particles that may contaminate the sensor surface and produce blemishes in the images made by the camera; 2) the curing of the UV-cure epoxy adds cycle time to the manufacturing process; 3) the epoxy impedes rework of modules that are discovered to be out of focus at final test; and 4) the thread tolerances allow for play in the threaded engagement, which can result in relative movement after focus is set, but before UV cure.

BRIEF SUMMARY OF THE INVENTION

In accordance with embodiments of the invention, a locking positioning mechanism having a cam-locking configuration is provided. The mechanism of embodiments of the invention includes a first element and a second element, the first element and second element rotatable relative to one another about a common rotational axis between a locked orientation and an unlocked orientation and axially translatable relative to one another. The mechanism according to embodiments further includes one or more first locking surfaces attached to the first element and one or more second locking surfaces attached to the second element. The second locking surfaces are configured to clear the first locking surfaces in the unlocked orientation sufficiently to facilitate the above-mentioned axial translation. The second locking surfaces are configured for an interference fit with the first locking surfaces in the locked orientation to facilitate fixing the relative translational position of the first and second elements.

In accordance with embodiments of the invention, a method of rotationally and axially reversibly locking a positioning mechanism is provided. The method according to embodiments includes providing a first element having one or more first locking surfaces and a second element having one or more second locking surfaces, and rotating first and second elements relative to one another about a common rotational axis to an unlocked rotational orientation in which first and second elements axially translate freely relative to one another. The method of such embodiments further includes freely translating first and second elements relative to one another to a desired relative translational position, and rotating first and second elements relative to one another to obtain an interference fit between a first locking surface and a second locking surface. The interference fit locks the positioning mechanism rotationally and axially.

DETAILED DESCRIPTION OF THE INVENTION

Figure 1A:
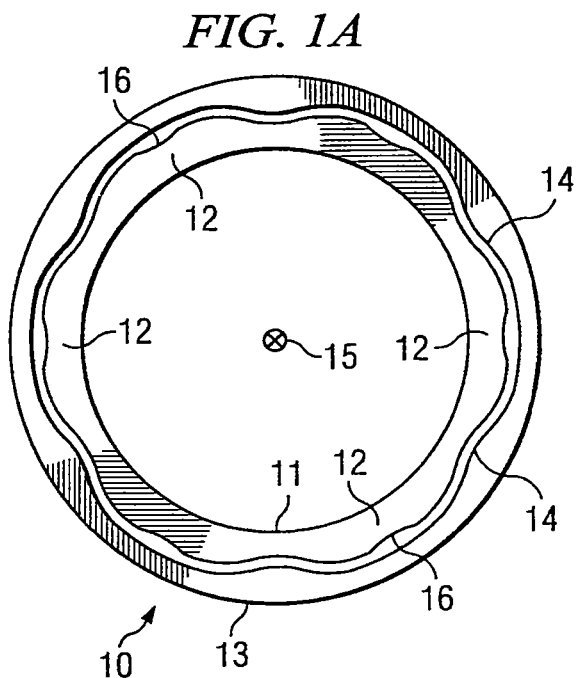
FIG. 1A depicts a cam-locking mechanism including two substantially concentric locking elements with complementary cam surfaces, in accordance with embodiments of the invention.

FIG. 1A depicts cam-locking mechanism 10 including two substantially concentric locking elements 11 and 13 with opposed complementary undulating cam surfaces in accordance with embodiments of the invention. Locking elements 11 and 13 may be made of materials that are elastically deformable, for example, plastics or metals.

Although locking elements may be provided in any number of shapes and configurations according to embodiments of the invention, the locking elements have opposing outer and inner cylindrical faces upon which cam surfaces are disposed for providing locking engagement as described herein. According to the illustrated embodiment, inner locking element 11 has cam surfaces 12 on an outside cylindrical face thereof, and outer locking element 13 has cam surfaces 14 on an inside cylindrical face thereof. Cam surfaces 12 and 14 may be integral portions of respective locking elements 11 and 13, or may be attached to the respective locking element using any of various techniques existing currently or in the future.

Figure 1C:
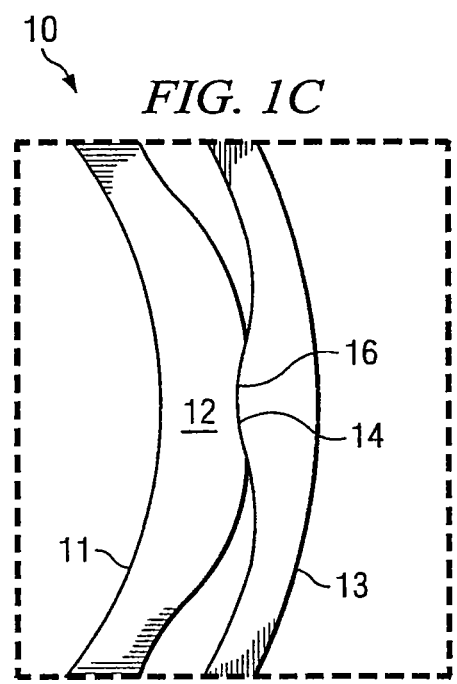
FIG. 1C is a detail view of FIG. 1B showing cam surfaces in the locked orientation.

Cam-locking mechanism 10 of the illustrated embodiment has six cam surfaces 12 and 14 equally spaced circumferentially on each of locking elements 11 and 13. Other embodiments may have other numbers of cam surfaces, e.g., one or two cam surfaces equally spaced circumferentially on each of the locking elements. Embodiments of the present invention implement three or more cam surfaces in order to provide greater positioning stability. Although the illustrated embodiment includes undulating cam surfaces, other cam surface configurations may be utilized, such as plateau shaped cam surfaces (shown in FIG. 1F), saw tooth shaped cam surfaces (shown in FIG. 1G), etc. Moreover, combinations of cam surface configurations may be utilized to provide a locking mechanism having desired attributes. Design trade-offs can be made for example to balance torque to lock, rotation to lock, and both axial and rotational locking strength.

Inner locking element 11 and outer locking element 13 of the illustrated embodiment share common cylinder axis 15 which is perpendicular to the plane of the figure. That is, inner locking element 11 and outer locking element 13 are disposed coaxially with respect to axis 15. Cam surfaces 12 and 14, each protruding radially from their respective one of inner locking element 11 and outer locking element 13, present surfaces parallel to cylinder axis 15. Cam surfaces 12 and 14 of the illustrated embodiment form radial ridges or corrugations, shown here having substantially uniform cross-sections. FIG. 1A shows cam-locking mechanism 10 in an unlocked orientation, in which cam surfaces 12 of inner locking element 11 clear cam surfaces 14 of outer locking element 13 sufficiently to allow locking elements 11 and 13 to translate axially relative to one another parallel to cylinder axis 15.

Figure 1B:
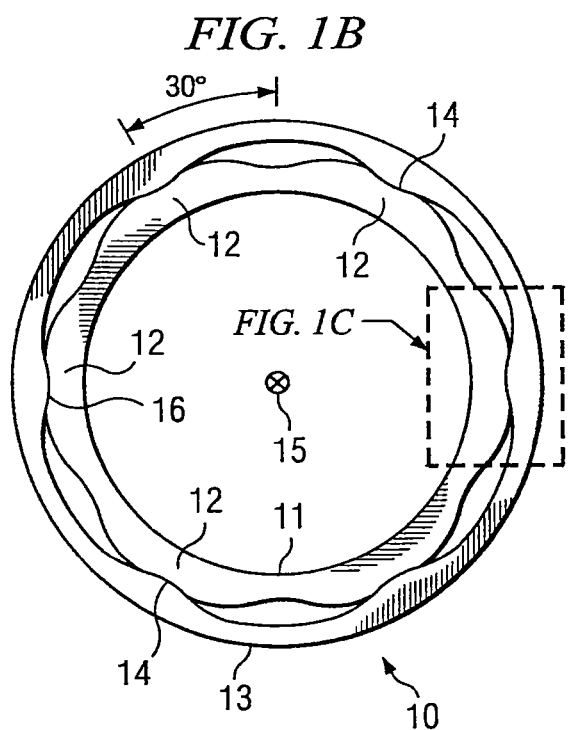
FIG. 1B depicts the cam-locking mechanism of FIG. 1A in a locked orientation.

FIG. 1B depicts cam-locking mechanism 10 in a locked orientation. Specifically, inner locking element 11 and outer locking element 13 have been rotated about axis 15 relative to each other such that cam surfaces 12 of inner locking element 11 have engaged cam surfaces 14 of outer locking element 13. In one embodiment of cam-locking mechanism 10, where six cam surfaces are equally spaced circumferentially, a 30-degree rotation may be implemented to move from a fully unlocked orientation (FIG. 1A) to a fully locked orientation (FIG. 1B). According to the illustrated embodiment, the relative rotation of inner locking element 11 and outer locking element 13 is sufficient to have caused interference between cam surfaces 12 and 14 such that axial translation of inner locking element 11 relative to outer locking element 13 is prevented. Moreover, the relative rotation of inner locking element 11 and outer locking element 13 of the illustrated embodiment has caused a portion of cam surfaces 14 to engage corresponding ones of detents 16 (FIG. 1C) formed in cam surfaces 12, thereby discouraging further relative rotational movement of inner locking element 11 relative to outer locking element 13.

Cam-locking mechanism 10 of the illustrated embodiment may be readjusted axially by unlocking locking elements 11 and 13 through rotation relative to one another about cylinder axis 15, translating their respective axial positions, and again rotating the locking elements to re-lock their relative positions. The interference fit in the locked position prevents relative axial movement between elements 11 and 13.

FIG. 1C is a detail view of FIG. 1B showing cam surfaces 12 and 14 when cam-locking mechanism 10 is in a locked orientation. When cam-locking mechanism 10 of this particular embodiment is in the locked orientation, cam surfaces 14 on the inner surface of outer locking element 13 rest in detents 16 in cam surfaces 12 on inner locking element 11. Detents 16 provide an interference fit between inner and outer cam surfaces 12 and 14. Such detents help prevent the cam-locking mechanism from slipping out of the locked orientation and provide positive locking and a stable locked resting relationship between locking elements 11 and 13.

Detents 16 may be preformed in the surface of cam surfaces 12, such as at a time of manufacture. Although shown formed in cam surfaces 12, it should be appreciated that detents 16 may be formed in cam surfaces 14 of outer locking element 13 in addition to or in the alternative to being formed in cam surfaces 12. It is not necessary for every cam surface 12 and 14 to provide a detent. However, greater positioning stability is obtained by providing three or more detents on equally circumferentially-spaced cam surfaces.

Figure 1D:
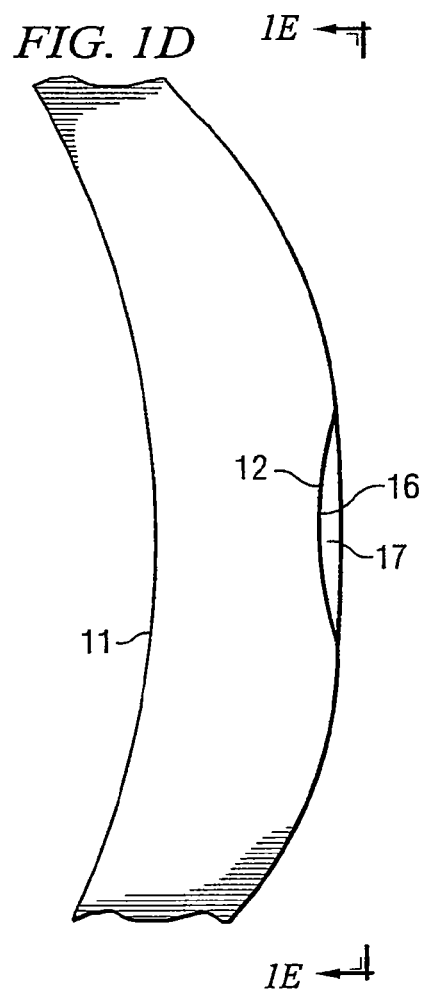
FIGS. 1D and 1E depict a detent of an inner locking element containing additional thin blade structures.
Figure 1E:
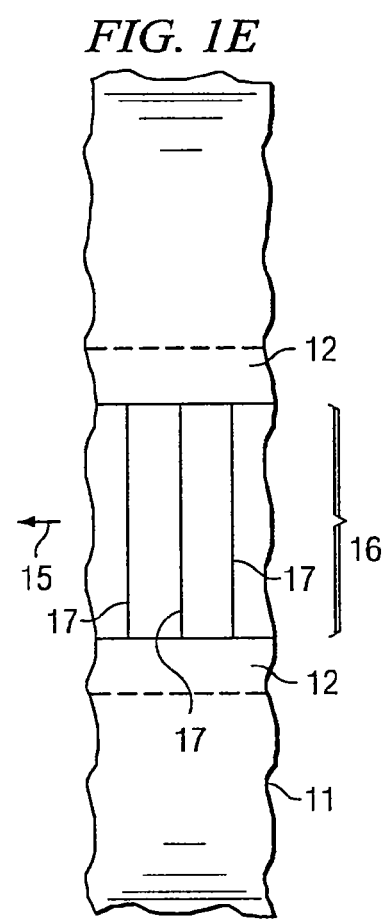
Figure 1F:
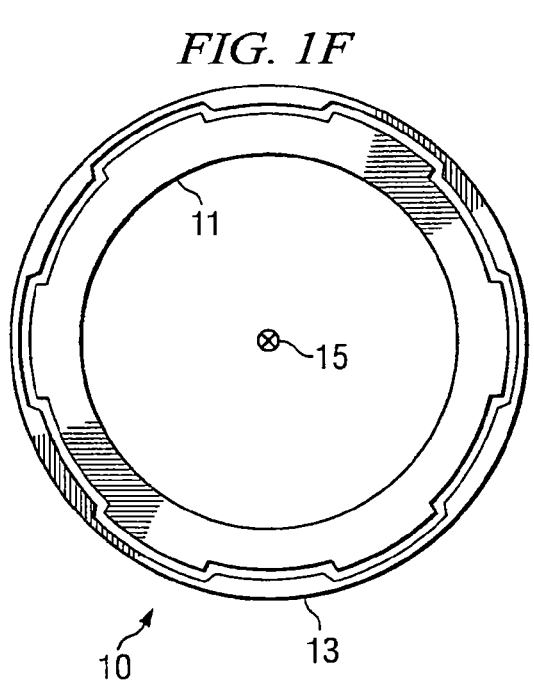
FIGS. 1F and 1G depict alternative embodiment cam surface configurations.
Figure 1G:
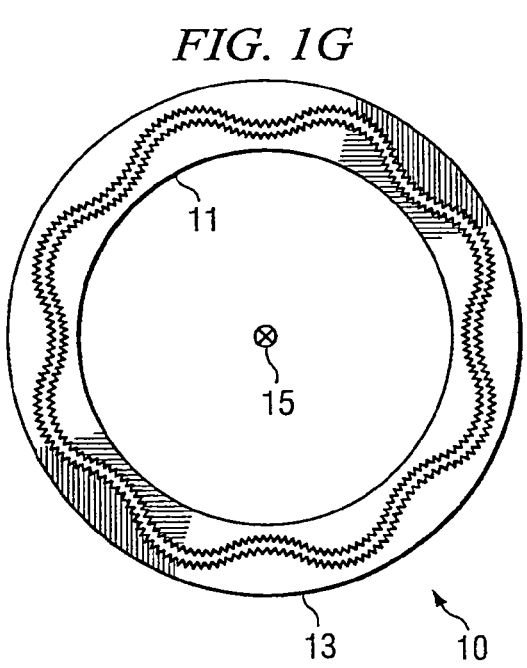

FIGS. 1D and 1E depict detent 16 of inner locking element 11 containing thin blade (or other edge) structures 17. When cam surface 14 of outer locking element 13 is snapped into detent 16, the blade structures of the illustrated embodiment bite into cam surface 14 of outer locking element 13, thereby further discouraging relative axial translation of elements 11 and 13 relative to one another. Annular blade structures 17 may alternatively be formed in one or more detents of outer locking element 13, and may bite into cam surface 12 of inner locking element 11. The blade structures may be staggered in axial position on circumferentially successive detents. Staggering these blade structures at different axial positions in circumferentially successive detents allows the blade structures to index at least a limited number of times to fresh, undeformed areas of the cam surface when readjusting cam-locking mechanism 10. Additionally or alternatively, grooves may be provided in the cam surfaces of a corresponding locking element, such that the annular blade structures slide within grooves as locking elements 11 and 13 are moved radially with respect to one another.

Figure 1H:
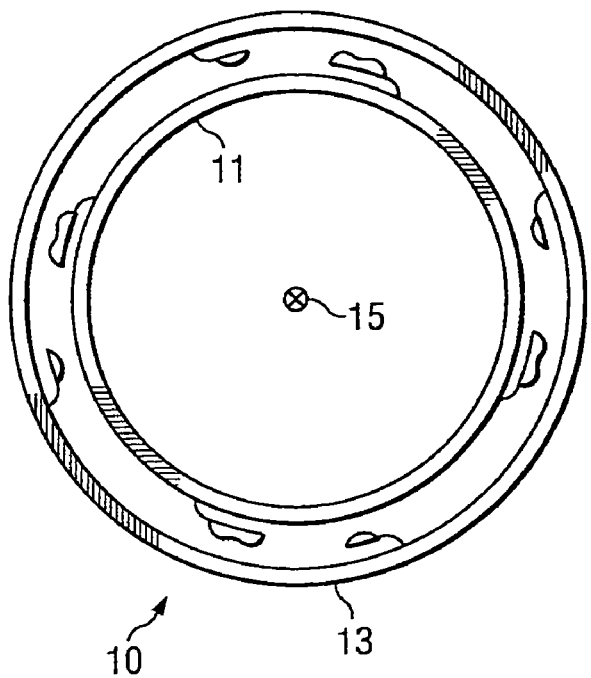
FIGS. 1H and 1I depict alternative embodiments of cam-locking mechanisms of the present invention.
Figure 1I:
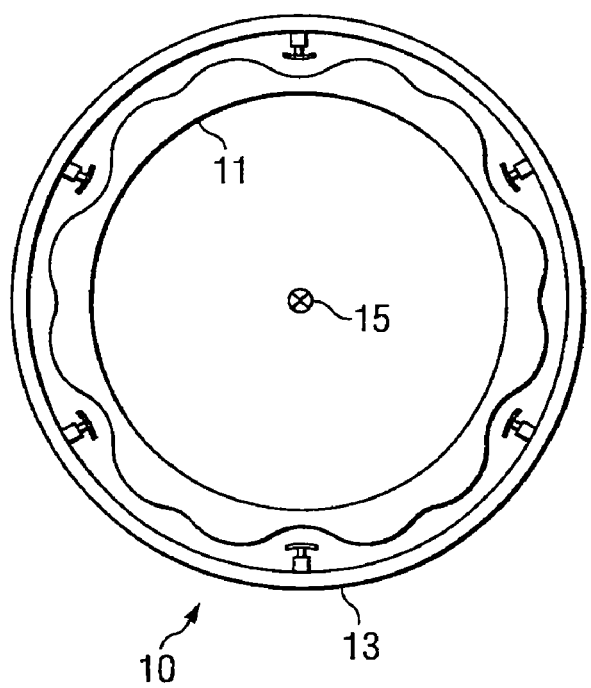

Embodiments of the invention may be configured differently from the configuration depicted in FIGS. 1A-1C. For example, one or both of the elements may support interference fitting surfaces on elastically deformable arms extending radially from concentric surfaces having a common axis of rotation, as shown in FIG. 1H. One or both concentric elements may have smooth radially telescoping interface extensions that slide both axially and radially with respect to a first locking element (e.g., locking element 11) and slides radially with respect to a second locking element (e.g., locking element 13) and which facilitate axial alignment of the locking elements, as shown in FIG. 1I.

Referring again to FIGS. 1A and 1B, inner locking element 11 of the illustrated embodiment includes an inside circumference into which a component, such as a lens, may be disposed. By disposing a first component, such as a lens, in a fixed position with respect to inner locking element 11 and disposing a second component, such as an optical sensor, in a fixed position with respect to outer locking element 13 (e.g., via a camera housing), adjustment of the relative positions of the first and second components is made through relative translation of the locking elements according to embodiments of the invention. According to one embodiment, inner locking element 11 is translated axially relative to outer locking element 13 to establish a proper focal distance with respect to the lens mounted in element 11 and the optical sensor coupled to element 13 during a manufacturing assembly process. Thereafter, inner locking element 11 is rotated about axis 15 to cause cam surfaces 12 to engage cam surfaces 14 and fix the relative positions of elements 11 and 13, and thus the relative axial positions of the lens and the optical sensor.

Figure 2:
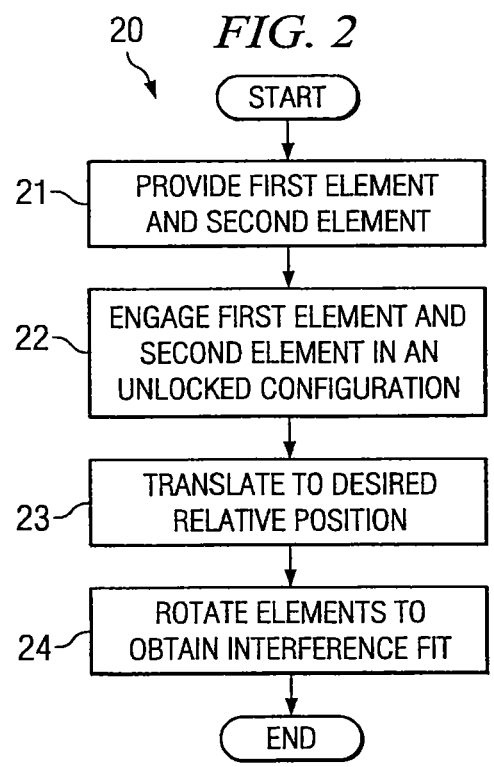
FIG. 2 is a flow diagram illustrating an operational sequence of rotationally and axially reversibly locking a cam-locking mechanism, in accordance with embodiments of the invention.
Figure 3A:
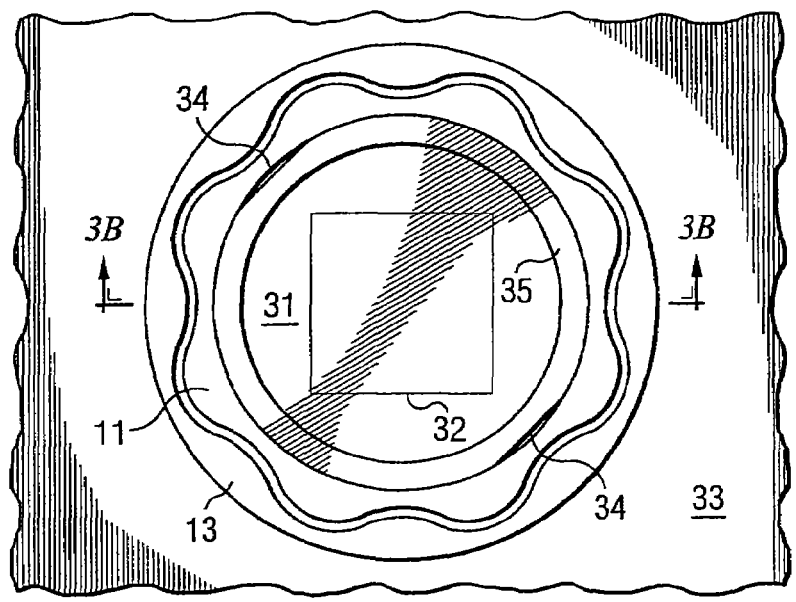
FIGS. 3A and 3B show one embodiment of the locking mechanism for use in a lens adjustment system.
Figure 3B:
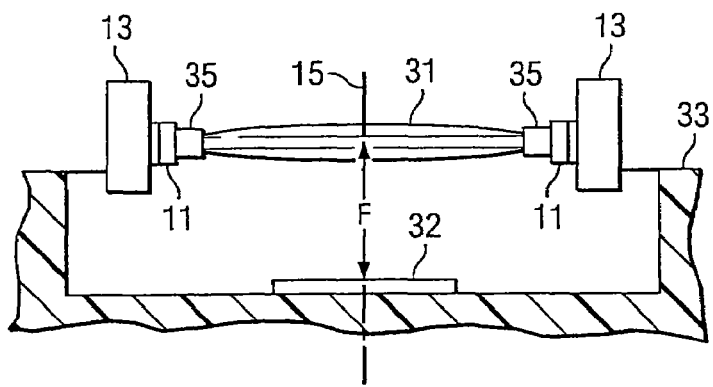
Figure 3C:
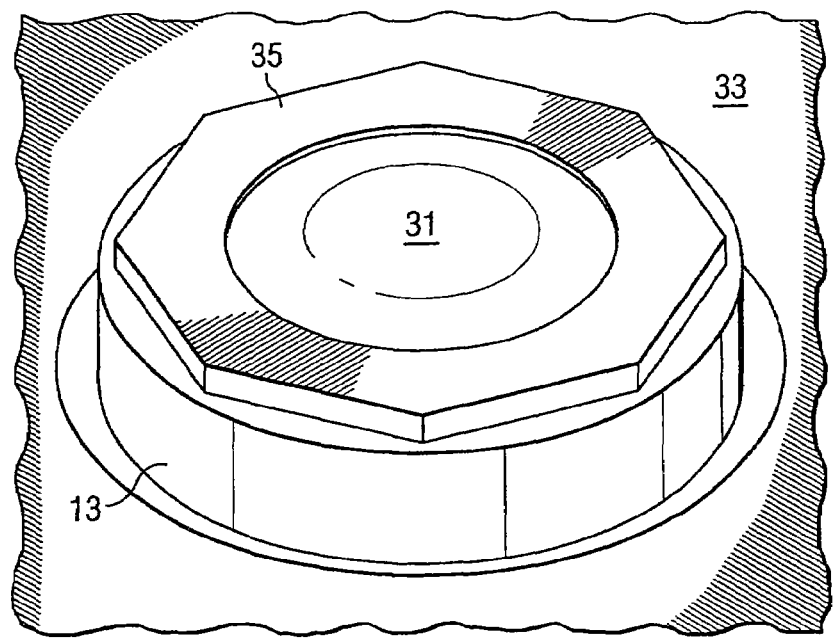
FIG. 3C shows another embodiment of the locking mechanism for use in a lens adjustment system.

FIG. 2 provides a flow diagram illustrating operational sequence 20 of rotationally and axially reversibly locking a cam-locking mechanism, such as mechanism 10 of FIGS. 3A and 3B, in accordance with embodiments of the invention. Cam-locking mechanism 10 of FIGS. 3A-3C substantially corresponds to that of FIG. 1A, except that camera components are coupled to the locking elements. Specifically, in the illustrated embodiment of FIGS. 3A and 3B, lens 31 is shown mounted to inner locking element 11 using lens holder 35 and optical sensor 32 is shown coupled to outer locking element 13 via camera housing 33. Housing 33 may be part of the body of a camera phone, for example. Lens 31 is shown in FIG. 3C with lens holder 35 coupling the lens to inner locking element 11 (not visible in the illustration) which is nested inside of outer locking element 13.

Lens holder 35 of FIG. 3A includes slots 34 for accepting an adjustment tool used in adjustment and locking operations as described herein. Similarly, lens holder 35 of FIG. 3C includes a hexagonal surface arrangement, similar to that used with respect to nuts and other fasteners, for accepting an adjustment tool used in adjustment and locking operations as described herein.

In operation 21, a first element having first locking surfaces (element 11) and second element having second locking surfaces (element 13) are provided. In operation 22, the first and second elements are engaged with one another in an unlocked configuration in which the first and second elements axially translate freely relative to one another. For example, element 11 and element 13 may be rotated relative to one another about a common rotational axis (axis 15) to an unlocked rotational orientation. In operation 23, the first and second elements are freely translated axially relative to one another to a desired relative axial position. For example, a distance equal to the focal length F of lens 31 may be established between lens 31 and optical sensor 32. In operation 24, the first and second elements are rotated relative to one another to obtain an interference fit between the first locking surfaces (cam surfaces 12) and the second locking surfaces (cam surfaces 14). This interference fit locks the cam-locking mechanism both rotationally and axially.

It is envisioned that cam-locking mechanism 10 will typically be employed automatically using rotating and translating machinery. Alternatively, elements 11 and 12 may be rotated and translated relative to one another simply by gripping and twisting the elements manually, or by employing tooling having varying degrees of complexity. The use of machinery or tooling may discourage undesired manual post-assembly tampering.

Although embodiments of the invention have been described herein with respect to use in positioning and aligning lenses, for example fixed-focus lenses for cameras (e.g., digital cameras embedded in wireless telephones or film cameras such as those provided as disposable or "one-time-use" cameras), the concepts of the present invention have applicability in any number of situations.

From the above, it can be readily appreciated that embodiments of the invention address various undesirable attributes in the traditional design and associated assembly process. In particular, embodiments of the invention provide a locking mechanism which does not require adhesives to provide locking of components in a desired relative position, and thus do not require increased cycle times to accommodate curing or special handling of adhesive chemicals. Moreover, locking mechanisms of embodiments of the invention, although providing a fixed engagement of components sufficient to maintain relative positions of components throughout the useful life of a product, are reversible to facilitate rework of modules that are discovered to be improper relative positions, such as at final product testing. Embodiments of the present invention provide a locking mechanism in which locking engagement is less likely to generate particles that may contaminate a sensor surface and produce blemishes in the images made by a camera in which the mechanism is utilized. The locking mechanisms of embodiments provide for fixing of components in desired relative positions substantially without play which can result in relative movement after engagement of the locking mechanism.

The invention claimed is:

1. A locking positioning mechanism, comprising:
   a pair of concentric locking elements disposed concentrically with respect to each other, wherein in an assembled form of the locking positioning mechanism at least one of the concentric locking elements is rotatable with respect to the other concentric locking element about an axis of rotation between a locked configuration and an unlocked configuration;
   an outer surface of an inner one of said concentric elements having a cam surface geometry; and
   an inner surface of an outer one of said concentric elements having a cam surface geometry complementary to said cam surface geometry of said inner concentric element,
   wherein the cam surface geometry of at least one of said concentric elements comprises an undulating contour defined circumferentially about the axis of rotation and including a plurality of saw-tooth-shaped portions arranged on the undulating contour,
   wherein in the locked configuration of the assembled locking positioning mechanism, the saw-tooth-shaped portions arranged on the undulating contour of said at least one concentric locking element are frictionally engaged with the cam surface of the other concentric element to limit relative rotation of the concentric locking elements, and
   wherein in the unlocked configuration of the assembled locking positioning mechanism, the saw-tooth-shaped portions arranged on the undulating contour of said at least one concentric locking element are disengaged from the cam surface of the other concentric element to (i) permit relative rotation of the concentric locking elements about the axis of rotation, and (ii) permit relative axial translation of the concentric locking elements in a direction along the axis of rotation.

2. A mechanism for locking a lens in a desired relative position, said mechanism comprising:
   a pair of concentric locking elements disposed concentrically with respect to each other, wherein in an assembled form of the mechanism at least one of the concentric locking elements is rotatable with respect to the other concentric locking element about an axis of rotation between a locked configuration and an unlocked configuration, wherein said lens is coupled to one of said locking elements;
   an outer portion of an inner one of said locking elements having a cam surface; and
   an inner portion of an outer one of said locking elements having a cam surface complementary to said cam surface of said inner locking element,
   wherein the cam surface geometry of at least one of said concentric elements comprises an undulating contour defined circumferentially about the axis of rotation and including a plurality of saw-tooth-shaped portions arranged on the undulating contour,
   wherein in the locked configuration of the assembled mechanism, the saw-tooth-shaped portions arranged on the undulating contour of said at least one concentric locking element are frictionally engaged with the cam surface of the other concentric element to limit relative rotation of the concentric locking elements, and
   wherein in the unlocked configuration of the assembled mechanism, the saw-tooth-shaped portions arranged on the undulating contour of said at least one concentric locking element are disengaged from the cam surface of the other concentric element to (i) permit relative rotation of the concentric locking elements about the axis of rotation, and (ii) permit relative axial translation of the concentric locking elements in a direction alone the axis of rotation.

3. The mechanism of claim 2 wherein said lens is part of the optical system of a camera.

4. The mechanism of claim 2 wherein at least one of said cam surfaces is constructed from deformable material.

5. A camera comprising:
   a housing;
   a lens;
   an image sensor;

a locking positioning mechanism including an inner locking element and an outer locking element disposed concentrically with respect to each other, wherein in an assembled form of the locking positioning mechanism at least one of the locking elements is rotatable with respect to the other locking element about an axis of rotation between a locked configuration and an unlocked configuration, said inner locking element is coupled to said lens and said outer locking element is coupled to said image sensor via said housing, wherein:

an outer portion of said inner locking element has a cam surface geometry, an inner portion of said outer locking element has a cam surface geometry complementary to said cam surface of said inner locking element, and the cam surface geometry of at least one of said locking elements comprises an undulating contour defined circumferentially about the axis of rotation and including a plurality of saw-tooth-shaped portions arranged on the undulating contour, wherein in the locked configuration of the assembled locking positioning mechanism, the saw-tooth-shaped portions arranged on the undulating contour of said at least one locking element are frictionally engaged with the cam surface of the other concentric element to limit relative rotation of the concentric locking elements, and wherein in the unlocked configuration of the assembled locking positioning mechanism, the saw-tooth-shaped portions arranged on the undulating contour of said at least one concentric locking element are disengaged from the cam surface of the other concentric element to (i) permit relative rotation of the concentric locking elements about the axis of rotation, and (ii) permit relative axial translation of the concentric locking elements in a direction along the axis of rotation.

6. The camera of claim 5, further comprising:

a lens holder which couples the lens to the inner locking element, the lens holder including a slot which is configured to receive an adjustment tool used to rotate the one of the locking elements relative to the other to establish a locking engagement between said locking elements.

7. The camera of claim 5, further comprising:

a lens holder which couples the lens to the inner locking element, the lens holder having a hexagonal outer contour used to rotate the one of the locking elements relative to the other to establish a locking engagement between said locking elements.

8. A method of manufacturing a locking positioning mechanism, said method comprising:

forming a cylindrically-shaped first locking element comprising an axis of rotation, an undulating surface defined circumferentially about the axis of rotation, and a plurality of saw-tooth-shaped portions arranged on the undulating contour;

forming a cylindrically-shaped second locking element comprising an axis of rotation, a surface defined circumferentially about the axis of rotation and a plurality of saw-toothed-shaped portions arranged on the surface;

assembling the first locking element onto the second locking element such that the axes of rotation of the locking elements are substantially aligned and the saw-toothed-shaped portions of the first and second locking elements are capable of inter-engagement, wherein in the assembled form of the locking positioning mechanism at least one of the locking elements is rotatable with respect to the other locking element about the axis of rotation between a locked configuration and an unlocked configuration;

wherein in the locked configuration of the assembled locking positioning mechanism, the saw-tooth-shaped portions of the first locking element are frictionally engaged with the saw-tooth-shaped portions of the second locking element to limit relative rotation of the locking elements, and wherein in the unlocked configuration of the assembled locking positioning mechanism, the saw-tooth-shaped portions of the first locking element are disengaged from the saw-tooth-shaped portions of the second locking element to (i) permit relative rotation of the locking elements about the axis of rotation, and (ii) permit relative axial translation of the locking elements in a direction along the axis of rotation.

* * * * *